United States Patent [19]
Schwendimann

[11] Patent Number: 5,613,525
[45] Date of Patent: Mar. 25, 1997

[54] METHOD AND APPARATUS FOR GENERATING AN ARTIFICIAL ANGULAR SHAFT POSITION TO OPERATE A WEAVING MACHINE

[75] Inventor: Markus Schwendimann, Andwil, Switzerland

[73] Assignee: Sulzer Ruti AG, Switzerland

[21] Appl. No.: 595,604

[22] Filed: Feb. 2, 1996

[30] Foreign Application Priority Data

Feb. 9, 1995 [EP] European Pat. Off. .............. 95810085

[51] Int. Cl.$^6$ .......................... D03D 51/00; G05B 19/042
[52] U.S. Cl. .................... 139/1 E; 364/470.11; 318/603; 318/41
[58] Field of Search ..................... 139/1 E, 1 R, 139/82, 49; 318/466, 41, 603; 364/470, 921.1, 470.11

[56] References Cited

U.S. PATENT DOCUMENTS

| | | | |
|---|---|---|---|
| 4,364,002 | 12/1982 | Suzuki et al. | 139/1 R |
| 4,617,498 | 10/1986 | Ruppert | 318/41 |
| 5,276,627 | 1/1994 | Makino . | |
| 5,311,752 | 5/1994 | Gille | 66/207 |

FOREIGN PATENT DOCUMENTS

| | | |
|---|---|---|
| 0067250 | 12/1982 | European Pat. Off. . |
| 0547004A1 | 6/1993 | European Pat. Off. . |
| 4242141A1 | 6/1993 | Germany . |
| WO90/09474 | 8/1990 | WIPO . |

*Primary Examiner*—Andy Falik
*Attorney, Agent, or Firm*—Townsend and Townsend and Crew LLP

[57] ABSTRACT

A weaving machine having a rotating main shaft for driving the weaving machine, with a plurality of accessories on the weaving machine for weaving cloth is provided with an artificial signal of shaft position. A generator generates the artificial signal representing the desired angular position of the main driving shaft of the weaving machine. This generator generates the signal independent of actual angular position of the main shaft. A drive drives the main shaft of the weaving machine. The drive is responsive to the signal for the desired angular position of the main shaft. This drive responds independently of the actual angular position of the main shaft of the weaving machine. At least one weaving machine accessory is present for performing functions on the cloth being woven, such as a thread tensioning device, cloth takeoff device, or nozzle controls, for projectile-type weft insertion. These accessories also receive the artificial signal of desired shaft position, and function responsive to the signal. The arrangement avoids the inevitable inaccuracy introduced when main driving shafts with varying dynamic loads minutely vary at positions of shaft rotation takeoff. An apparatus and method for weaving machine control is disclosed.

13 Claims, 4 Drawing Sheets

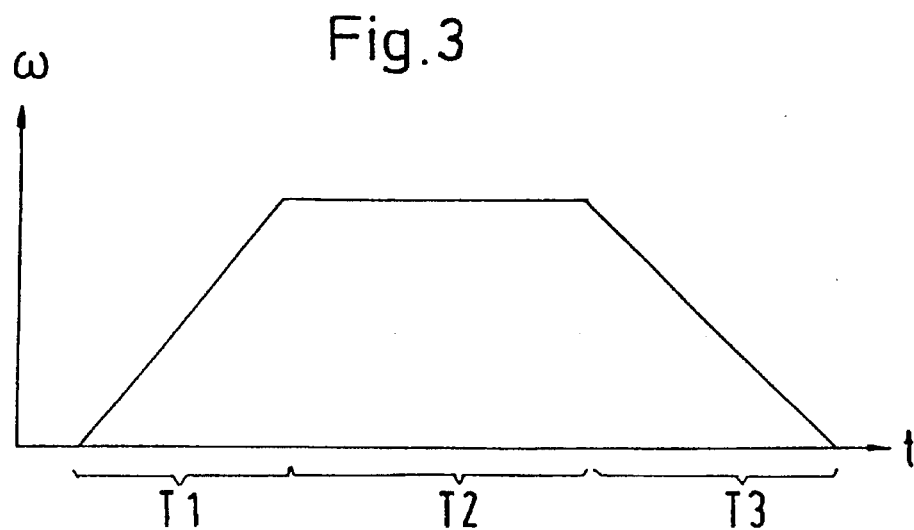
Fig. 3
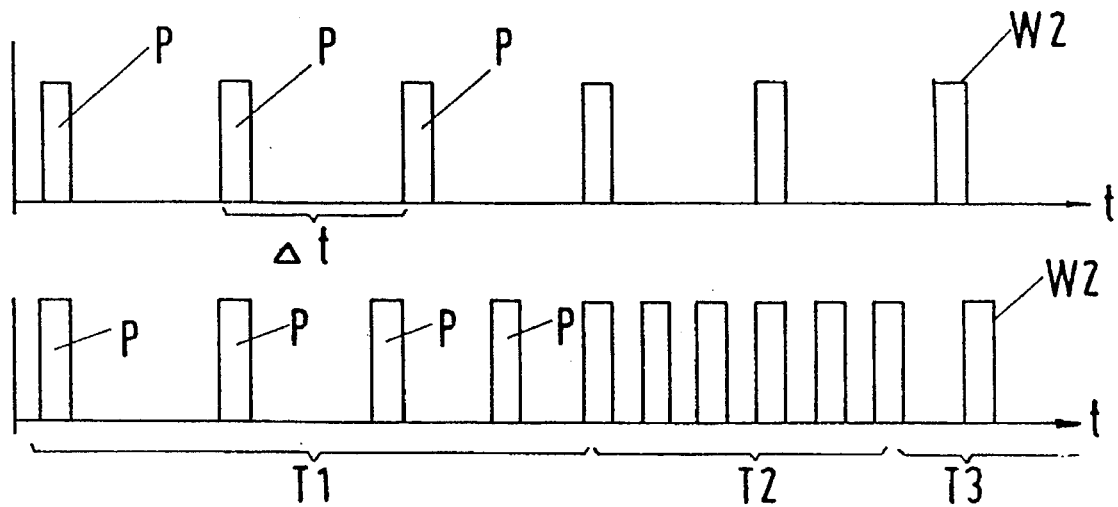
Fig. 4a
Fig. 4b

METHOD AND APPARATUS FOR GENERATING AN ARTIFICIAL ANGULAR SHAFT POSITION TO OPERATE A WEAVING MACHINE

The invention relates to a method for operating a weaving machine in accordance with the preamble of claim 1. The invention further relates to an apparatus for operating a weaving machine in accordance with the preamble of claim 7.

BACKGROUND OF THE INVENTION

A method and also an apparatus for operating a weaving machine is known from EP 0 547 004 in which the weaving machine positioning members and drives are each individually controlled by a respective local computer with these local computers being connected to a master computer via a serial data line. The master computer supplies the local computers with the data and control commands necessary for the weaving machine operation. Furthermore, the angular position of the main shaft of the weaving machine is detected by a sensor therefor. The signal derived in this way representing the angular position is then passed on to each local computer and also to the master computer.

This known arrangement has the disadvantage that all computers and therefore all drives and positioning members are synchronized in a fixed manner to the main shaft of the weaving machine.

SUMMARY OF THE INVENTION

A weaving machine having a rotating main shaft for driving the weaving machine, with a plurality of accessories on the weaving machine for weaving cloth is provided with an artificial signal of shaft position. A generator generates the artificial signal representing the desired angular position of the main driving shaft of the weaving machine. This generator generates the signal independent of actual angular position of the main shaft. A drive drives the main shaft of the weaving machine. The drive is responsive to the signal for the desired angular position of the main shaft. This drive responds independent of the actual angular position of the main shaft of the weaving machine. At least one weaving machine accessory is present for performing functions on the cloth being woven, such as a thread tensioning device, cloth takeoff device, or nozzle controls, for projectile-type weft insertion. These accessories also receive the artificial signal of desired shaft position, and function responsive to the signal. The arrangement avoids the inevitable inaccuracy introduced when main driving shafts with varying dynamic loads minutely vary at positions of shaft rotation takeoff. An apparatus and method for weaving machine control is disclosed.

The object of the invention is satisfied in that the generator for generating a signal representing the angular position of the weaving machine produces an artificial electronic signal representing the angular position and in that this signal is transmitted to the local computers as well as to the master computer via a data line so that the artificially produced signal representing the angular position serves as a reference for the drives and the positioning members. The signal representing the angular position is no longer taken from the drive shaft of the weaving machine with a sensor as in the prior art, but rather is produced in a synthetic, artificial manner, for example with the aid of a quartz oscillator. All drives and positioning members of the weaving machine are governed by this artificial signal representing the angular position.

An advantage of the invention is to be seen in that the artificial signal representing the angular position can be used as a kind of virtual master shaft with the signal representing the angular position serving as a reference signal which can be used for driving the weaving machine together with all its drives and positioning members.

A further advantage of the invention is to be seen in that the signal representing the angular position is no longer determined by the motion of the main shaft but rather is independent thereof. As a result, a plurality of different signals representing the angular position can be specified at different times or time periods. For example, during start-up or braking, a ramp-like function with respect to time can be prespecified for the rotational speed, with all the drives rotating synchronously in accordance with this function.

A further advantage of the invention is to be seen in that the individual drives and units may also be individually controlled and positioned so that, for example when curing a weft breakage, the main shaft stands still while only those components which need to be moved for curing the fault are moved and then driven into a defined position.

A further advantage of the invention is to be seen in that the weaving machine can be stopped at a defined rotational position, for example at zero degrees of the main shaft. This is possible since it can be calculated in advance how the weaving machine has to be driven in order to stop at this position. The temporal evolution of the signal representing the angular position needed for braking is calculated in advance and then applied during the braking phase of the weaving machine.

A further advantage of the invention is to be seen in that so-called electronic transmissions can be realized in a simple manner since the translation ratio between the signal representing the angular position and a unit to be driven can be electronically specified and changed at any time. For example, when driving the weaving machine at creep speed (i.e. dead slow) the main shaft can be driven at a different rotational speed from the other units.

In a further advantageous embodiment of the invention a signal representing the angular position of the weaving machine, preferably the angular position of the main shaft, is detected by means of a sensor. The signal measured thereby representing the angular position is supplied to a switching unit which, depending on the operational condition of the weaving machine, transfers to the computer as the signal representing the angular position either the measured signal or the artificially generated signal so that this signal serves as a reference for the drives and the positioning members. With this embodiment it can be selected whether the actual angular position of the weaving machine or the artificially produced signal representing the angular position is applied to the drives and the positioning members. This switching option has the advantage that, for example during start-up or braking of the weaving machine, the actual angular position can be used since for example, as a result of the inertia of mass, the position of the main shaft may deviate from an artificially predetermined signal representing the angular position. Therefore, via the use of the actual angular position during start-up or braking of the weaving machine all drives and positioning members can be driven in synchronisation to the angular position of the main shaft.

BRIEF DESCRIPTION OF THE DRAWINGS

FIGS. 2a–2d are representative artificial signals containing angular position information in which FIG. 2a illustrates pulses for rotating in a clockwise direction, FIG. 2b illustrates pulses for rotating in an counterclockwise position, FIG. 2c illustrates a signal having transition at 0° in a clockwise direction, and FIG. 2d illustrates a signal having transition in a counterclockwise direction;

FIG. 3 is a temporal evolution of rotational speed during start-up, normal operation, and braking; and FIGS. 4a and 4b are respective artificial signal positions representing the angular position of the main driving shaft.

DESCRIPTION OF THE PREFERRED EMBODIMENT

Figure 1A:
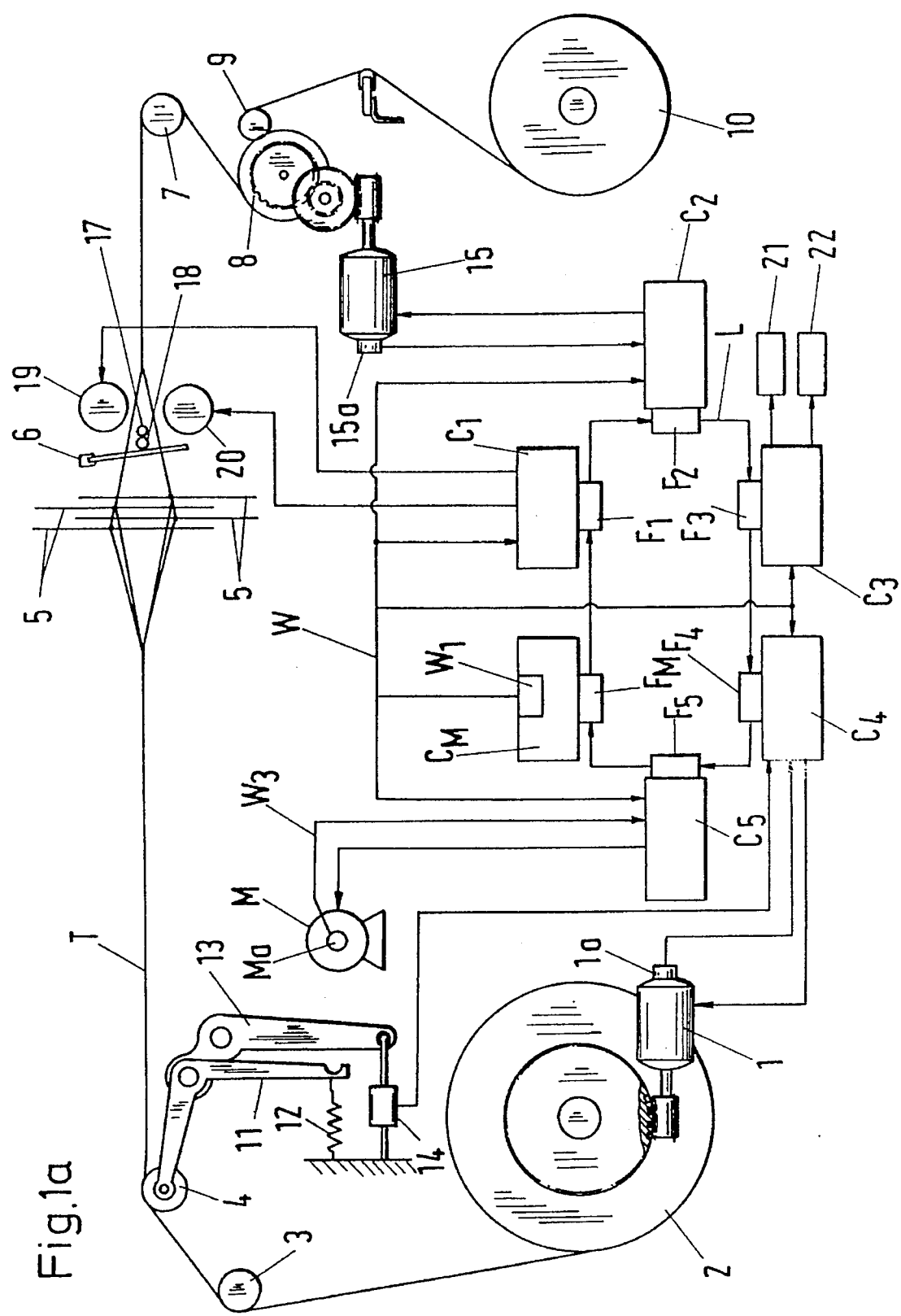
FIG. 1a is a schematic illustration of a weaving machine with a block circuit diagram of the control device of this invention.

The weaving machine in accordance with FIG. 1a comprises a principal (master) control device CM as well as a plurality of local (slave) control devices C1, C2, C3, C4 and C5. The control devices C1, C2, C3, C4, C5, CM each have a computer and are each connected to a common data bus L by respective communication devices F1, F2, F3, F4, F5, FM, the data bus L serving for data transmission. A generator W1 for generating a signal representing the angular position of the weaving machine produces a signal W2. The signal W2 is supplied to the control devices C1, C2, C3, C4, C5, CM via a further independent data line W. The generator W1 for generating a signal representing the angular position of the weaving machine can form a component of the master control device CM as shown in FIG. 1 or can also be formed as an independent unit which, in this case, would also comprise a communication device and would be connected to the common data bus L in order to communicate with in particular the master control device CM. The control device C5 is connected to the data line W and thus receives the signal W2 representing the angular position. The control device C5 receives further control commands from the master control device CM via the data bus L. The control device C5 regulates the main drive M of the weaving machine and monitors the angular position of the main shaft with a sensor Ma for angular position measurement. The control device C4 is in turn connected to the data line W as well as to the data bus L and drives the warp beam 2 with a drive 1. Moreover, the control device C4 measures the angular position of the drive 1 with a sensor for angular position measurement 1a and also measures the tension of the warp threads T with a sensor 14. Starting from the warp beam 2, the warp threads T pass over a deflection roller 3, a tension roller 4 and further via the yield shaft 5 and the fabric take-off device 7, 8, 9 to the fabric beam 10. The tension roller 4 comprises a tensioning device 11 with a spring element 12 as well as a deviation device 13 with sensor 14. The control device C2 drives the fabric take-off device 8 via a drive 15. The control device C2 monitors the drive 15 with a sensor for angular position measurement 15a. The weft insertion nozzles 17, 18 take off a weft yarn from a weft yarn measurement device 19, 20 which is controlled by the control device C1. The air pressure and also the switching-on time of the fluid nozzles 17, 18 are predetermined by the control device C3.

The master control device CM controls and monitors the entire weaving machine including all drives 1, 15, 19, 20 M and further units 19, 20, 21, 22. The control device CM applies an rotational speed to the generator W1 which, in turn produces a corresponding signal W2 representing the angular position which is supplied to each control device C1, C2, C3, C4, C5 via the common data line W. A data line W of this kind is also termed a clock bus. Together with the generator W1 for generating a signal representing the angular position of the weaving machine, this data line W forms a so-called synthetic master shaft because the corresponding signal W2 representing the angular position defines the rotational position which governs all the drives and units. The rotational position is no longer determined by the position of the main shaft, as in the prior art, but instead all drives including the drive M of the main shaft follow the rotational position given by the generator W1. Furthermore, the control device CM exchanges data, such as control commands or unit status information, with the slave control devices C1, C2, C3, C4, C5 over the common data bus L.

The artificial signal W2 representing the angular position is an electronically or optically transmitted signal. The temporal evolution of the signal W2 can be set according to a range of different possibilities. An example of a temporal evolution of the artificial signal W2 representing the angular position is shown in FIG. 4a. The signal is made up of individual rectangular pulses P which are separated from one another in time. The signal is defined in such a manner that 2048 pulses P correspond to one rotation of 360 degrees. In the present example, the rotation of 360 degrees relates to the main shaft of the weaving machine. With each pulse P, the main shaft is rotated by the drive M about an angle of 360/2048 degrees. The larger the number of pulses per temporal unit, the higher the rotational speed of the main shaft. The time $\Delta t$ between the individual pulses P thus determines the rotational speed. FIG. 4b shows the evolution of an artificial signal W2 representing the angular position in which the rotational speed increases in a first time period T1, is constant in a second time period T2 and reduces in a third time period T3. All the control devices C1, C2, C3, C4, C5, CM drive the controlled drives in a corresponding manner following the signal W2 representative of the angular position. FIG. 3 shows an example for the control of a weaving machine. The artificial signal W2 representing the angular position is modulated such that it gives a ramp-like increase of the rotational speed ω in a first time period T1 starting the weaving machine from rest. A constant rotational speed ω is given in a second time period T2 and, in a third time period T3, a ramp-like reduction of the rotational speed ω is given.

The braking of the weaving machine in the third time period T3 can also take place such that the weaving machine comes to rest in an exactly defined position.

Figure 2A:
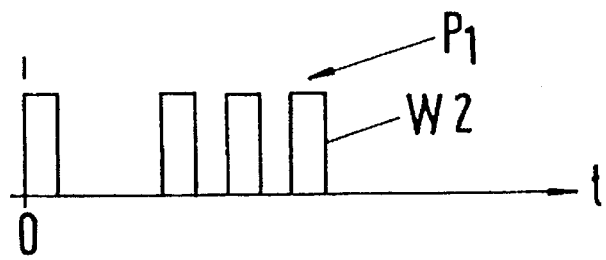
Figure 2B:
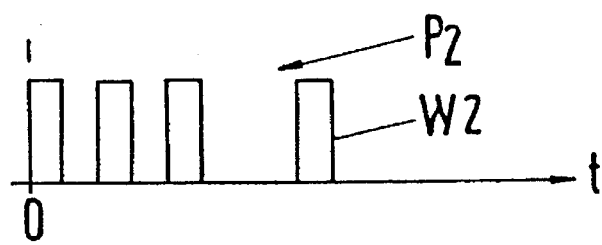
Figure 2C:
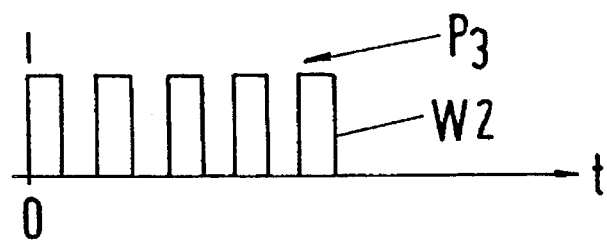
Figure 2D:
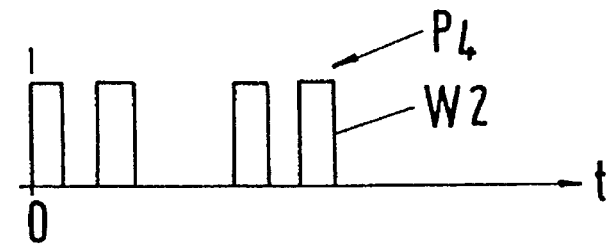

Further additional information can be superimposed by modulation onto the individual pulses P of the signal W2 shown in FIG. 4a. FIGS. 2a to 2d each show an individual pulse P of this kind with additional information. The signal sequence P1, which in total forms a pulse P, specifies that the rotation takes place in a clockwise direction. The signal sequence P2 specifies that the rotation takes place in an anti-clockwise direction. In order to exactly position the drives or units, additional pieces of information in accordance of FIG. 2c and 2d are provided. The signal sequence P3 states that a transition at zero degrees takes place, e.g. in relation to the main shaft, the rotation taking place in a clockwise direction. The signal sequence P4 states that a transition at zero degrees takes place, the rotation taking place in the anti-clockwise direction.

Figure 1B:
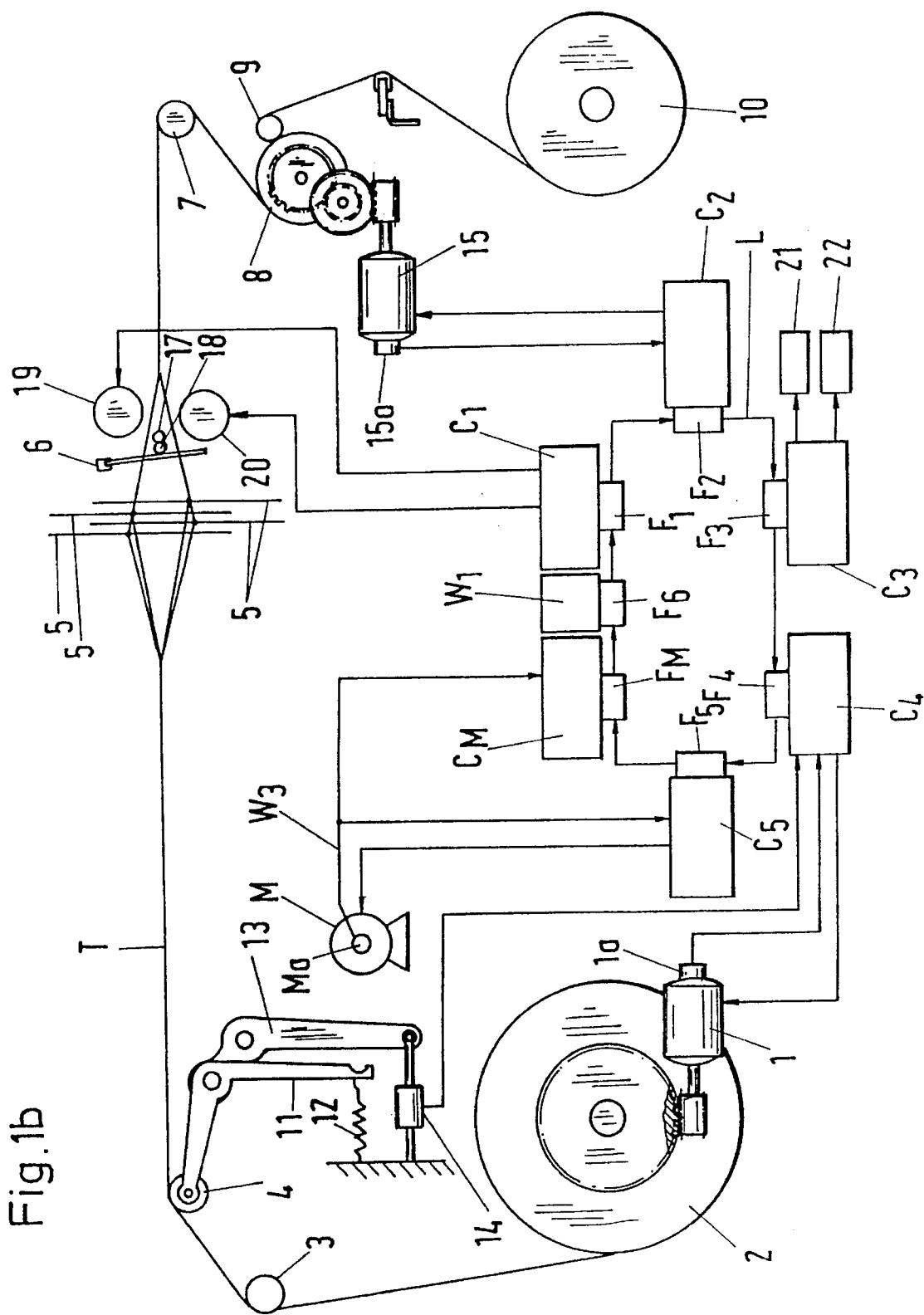
FIG. 1b is a schematic illustration of an alternate embodiment of a weaving machine, with the block circuit diagram of this invention.

FIG. 1b shows a block circuit diagram of a further embodiment of the control apparatus. In comparison to the embodiment of FIG. 1, the generator W1 for generating a signal representing the angular position of the weaving machine is connected directly to the common data bus L via a communication device F6. The signal W representing the angular position is similarly transferred to the further control devices C1, C2, C3, C4, C5, CM via the common data bus L. Since the signal W representing the angular position W has to be transmitted synchronously, the master control device CM ensures that, during time periods in which the signal W representing the angular position is to be expected, the data bus L is not used by any of the communication devices F1, F2, F3, F4, F5, FM for data transmission so that the data bus L is free for transmission of the signal W representing the angular position. The generator W1 for generating a signal representing the angular position of the weaving machine is controlled by the master control device CM, these being interconnected via the common data bus L.

In the embodiment of FIG. 1b, the angular position of the main shaft of the weaving machine is detected with a sensor Ma for angular position measurement. The corresponding signal W3 representing the angular position is then supplied to the master control device CM. The control device CM includes a switching unit which either transfers the current signal W3 representing the angular position or the signal W2 representing the angular position artificially produced by the generator W1 to the data bus L. This switching unit has the advantage that, for example by start-up or braking of the weaving machine, the current signal W3 representing the angular position can be set by the control devices C1, C2, C3, C4, C5. The main shaft of a weaving machine can, as a result of its inertia of mass, produce a signal W3 representing the angular position, for example during braking, which deviates from the artificially produced signal W3 representing the angular position. By using the current signal W3 during, for example braking the drives 1, 15, 19, 20 as well as the further units 19, 20, 21, 22 rotate in synchronization with main shaft.

The switching unit can form a component of the master control device CM and operate such that, in accordance with the embodiment of FIG. 1a, the generator W1 for generating a signal representing the angular position of the weaving machine either outputs the artificially produced signal W2 or the measured signal W3 to the separate data line W. Thus in this embodiment either the measured signal W3 or the artificially produced signal W2 is transmitted via the separate data line W.

The method and apparatus of the invention are suitable for various types of weaving machine, for example for air jet, projectile, rapier or series-shed weaving machines.

What is claimed is:

1. In a weaving machine having a rotating main shaft for driving the weaving machine and a plurality of accessories on the weaving machine for weaving cloth, each said accessory performing a function to the cloth as function of the general rotational position of the main shaft of the weaving machine, the improvement comprising:

a weaving machine having a main shaft for being driven in rotation to weave cloth;

a generator for generating a signal representing a desired angular position of the main shaft of the weaving machine independent of an actual angular position of the main shaft;

a drive for driving the weaving machine, the drive responsive to the signal for the desired angular position of the main shaft of the weaving machine independent of the actual angular position of the main shaft of the weaving machine;

at least one weaving machine accessory for performing functions on cloth being woven in the weaving machine as a general function of main shaft rotation of the weaving machine; and, means for driving the weaving machine accessory of the weaving machine responsive to the signal for the desired angular position of the main shaft of the weaving machine independent of the actual angular position of the main shaft of the weaving machine.

2. In a weaving machine having a rotating main shaft for driving the weaving machine according to claim 1 and wherein:

a master controller for controlling the speed of the weaving machine; and, the generator for generating the signal representing the desired angular position of the main shaft is responsive to the master controller.

3. In a weaving machine having a rotating main shaft for driving the weaving machine according to claim 1 and wherein:

a plurality of weaving machine accessories for each performing functions on the cloth being woven in the weaving machine as a general function of main shaft rotation;

means for driving each said weaving machine accessory responsive to the signal for desired angular position of the main shaft of the weaving machine independent of the actual angular position of the main shaft of the weaving machine.

4. In a weaving machine having a rotating main shaft for driving the weaving machine according to claim 1 and wherein:

a sensor for sensing the actual angular position of the weaving machine; and, means for switching the actual angular position of the main shaft of the weaving machine to the desired angular position of the weaving machine dependent upon the operational state of the weaving machine.

5. In a weaving machine having a rotating main shaft for driving the weaving machine according to claim 4 and wherein:

the operational state of the weaving machine includes start-up and braking of the weaving machine.

6. In a weaving machine having a rotating main shaft for driving the weaving machine according to claim 1 and wherein:

the weaving machine accessory is a fabric take off device.

7. In a weaving machine having a rotating main shaft for driving the weaving machine according to claim 1 and wherein:

the weaving machine accessory is a thread tensioning device.

8. In a weaving machine having a rotating main shaft for driving the weaving machine according to claim 1 and wherein:

the weaving machine accessory is a weft insertion nozzle.

9. A method of controlling a weaving machine having a rotating main shaft for driving the weaving machine and a plurality of accessories for weaving cloth, each said accessory performing a function to the passing cloth as function of the general rotational position of the main shaft, the process comprising the steps of:

providing a weaving machine having a main shaft for being driven in rotation to weave cloth;

generating a signal representing the desired angular position of the main shaft of the weaving machine independent of the actual angular position of the main shaft of the weaving machine;

providing a drive for driving the weaving machine, the drive responsive to the signal for the desired angular position of the main shaft of the weaving machine independent of the actual angular position of the main shaft of the weaving machine;

communicating the signal representing the desired angular position of the main shaft of the weaving machine to the drive to drive the rotating shaft of the weaving machine;

providing at least one accessory for performing functions on the cloth woven by the weaving machine, the at least one accessory responsive to the signal representing the desired angular position of the main shaft of the weaving machine; and, communicating the signal representing the desired angular position of the main shaft of the weaving machine to the at least one accessory to enable the accessory to perform functions on the cloth woven by the weaving machine.

10. A method of controlling a weaving machine according to claim 9 and wherein:

the generating step is responsive to a master controller generating a desired rate of rotation of the main shaft of the weaving machine.

11. A method of controlling a weaving machine according to claim 9 and wherein:

communicating the signal representing the desired angular position of the main shaft of the weaving machine to the at least one accessory includes modulating the signal representing the desired angular position of the main shaft to change the apparent desired angle of rotation to the accessory.

12. A method of controlling a weaving machine according to claim 9 and wherein:

measuring the actual angular rate of rotation of the main shaft of the weaving machine; and, substituting the actual angular position of rotation of the main shaft of the weaving machine for the desired angular position of the main shaft dependent upon the operational state of the weaving machine.

13. A method of controlling a weaving machine according to claim 12 and wherein:

substituting the actual angular rate of rotation of the main shaft of the weaving machine for the desired angular position of main shaft rotation of the weaving machine during start-up and braking.

* * * * *